(12) United States Patent
Nonogaki (10) Patent No.: US 6,363,266 B1
(45) Date of Patent: Mar. 26, 2002

(54) ELECTRONIC DEVICE

(75) Inventor: Masaru Nonogaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,518

(22) Filed: Mar. 1, 2000

(30) Foreign Application Priority Data

Mar. 1, 1999 (JP) .......................................... 11-053354

(51) Int. Cl.$^7$ .............................. H04Q 7/32; H04Q 7/18
(52) U.S. Cl. ..................... 455/572; 455/550; 455/574; 455/412; 320/114
(58) Field of Search ................................ 455/550, 572, 455/573, 574, 343, 575, 127, 517, 564, 424, 425, 351, 565, 412; 320/114

(56) References Cited

U.S. PATENT DOCUMENTS

| | | | |
|---|---|---|---|
| 5,497,507 A | * 3/1996 | Komaki ...................... 455/127 |
| 5,915,120 A | * 6/1999 | Wada et al. ............ 395/750.02 |
| 6,192,480 B1 | * 2/2001 | Barrus ......................... 713/300 |
| 6,201,977 B1 | * 3/2001 | Cathey et al. ................. 45/574 |
| 6,230,032 B1 | * 5/2001 | Liljegren .................... 455/572 |

* cited by examiner

Primary Examiner—William Trost
Assistant Examiner—Keith Ferguson
(74) Attorney, Agent, or Firm—Jay H. Maioli (57) ABSTRACT

An electronic device may include a plurality of function sections which can function independently. A CPU can control the functions of the respective function sections by controlling a power from the battery pack. A user may select a desired reserved function section and input an available time of the desired reserved function section by operating a key matrix, thereby executing the setting such that one or a plurality of function sections thus reserved can be used during a predetermined time period. The CPU may disable functions other than the functions of one or a plurality of function sections when a battery remaining capacity Qc becomes equal to a total necessary current accumulated remaining quantity of one or a plurality of function sections reserved by setting, and may disable the function of the function section with a priority N+1 each time the battery remaining capacity Qc becomes equal to the total necessary current accumulated remaining quantity of the function sections with priorities up to a priority (e.g. order in which function sections are selected) N (N is an integer greater than 1).

8 Claims, 6 Drawing Sheets

| | UNIT | TELEPHONE FUNCTION SECTION | MUSIC RECORDING FUNCTION SECTION | MUSIC REPRODUCTION FUNCTION SECTION | RADIO RECEPTION FUNCTION SECTION |
|---|---|---|---|---|---|
| CONSUMPTION CURRENT | mA | 500 | 200 | 100 | 50 |
| END VOLTAGE | V | 3.5 | 3.4 | 3.35 | 3.3 |
| BATTERY REMAINING CAPACITY PRESENTED WHEN BATTERY IS DEAD | mAh | 100 | 80 | 60 | 40 |

ELECTRONIC DEVICE

BACKGROUND OF THE INVENTION

1. Field of the Invention

This invention generally relates to an electronic device for use with a portable telephone, or the like with a function to record and reproduce a piece of music, or the like, for example. More particularly, this invention relates to an electronic device which may set a relationship between a battery remaining capacity and one or a plurality of function sections based on information of the one or the plurality of function sections which are reserved by user operation and an available time, or the like and in which functions of the respective function sections can be controlled with user's intention reflected thereon by individually controlling the functions of the respective function sections based on the relationship thus set.

2. Description of the Related Art

In general, electronic devices may associate a battery remaining capacity with available functions. For example, when a portable telephone is in the reception standby mode, a function may be disabled with a battery remaining capacity higher than that required to make an outgoing call in consideration of the state in which the portable telephone begins to transmit radio waves since an incoming call was received.

However, the above-mentioned association may be based on an idea in which a power supply of a certain function may be stopped immediately before such function become unavailable and cannot reflect a user's intention. Therefore, the portable telephone with a function to record and reproduce a piece of music, for example, cannot satisfy user's request such as "Although a music reproduction time is reduced, I would like to make a telephone call after having been listening to a piece of music".

SUMMARY OF THE INVENTION

It is an object of the present invention to provide an electronic device in which functions of respective function sections can be controlled with a user's intention reflected there on.

According to an aspect of the present invention, there is provided an electronic device powered by a battery and having a plurality of function sections which can function independently. This electronic device comprises a detection means for detecting a battery remaining capacity, a user operation means for selecting one or a plurality of function sections which are reserved from a plurality of function sections and inputting at least an available time of the one or the plurality of function sections, a setting means for setting a relationship between the battery remaining capacity and the available function section on the basis of operation information from the user operation means and a function control means for individually controlling functions of the plurality of function sections on the basis of the battery remaining capacity detected by the detection means and a relationship set by the setting means.

In this invention, the battery remaining capacity may be detected by the detection means. Also, a user may select one or a plurality of function sections which are reserved from a plurality of function sections by operating the user operation means. The setting means may set a relationship between the battery remaining capacity and the available function section by inputting at least an available time, or the like of the one or the plurality of function sections.

For example, the setting means may calculate a necessary current accumulated remaining capacity of the one or the plurality of function sections, and may set a relationship in which only the one or the plurality of function sections may become available if the battery remaining capacity may become below a total necessary current accumulated remaining capacity. Also, the setting means may calculate a necessary current accumulated remaining capacity of the one or the plurality of function sections, and may set a relationship in which only a functions section with a priority below a priority N (N is an integer greater than 1) if the battery remaining capacity is below a total quantity of necessary current accumulated remaining capacities of function sections with priorities up to the priority N. The setting means may calculate the necessary current accumulated remaining capacity of each function section by using input information of an available time and an available environment temperature of each function section, for example.

The functions of a plurality of function sections may be individually controlled on the basis of the relationship set by the above-mentioned setting means. For example, when the battery remaining capacity may become less than the total necessary current accumulated remaining capacity, if a relationship in which only the one or the plurality of function sections may be available, then functions of functions sections other than the one or the plurality of function sections may be disabled when the battery remaining capacity may become less than the total necessary current accumulated remaining capacity. Thus, the functions of the respective function sections can be controlled with a user's intention reflected thereon. Therefore, it may become possible to prevent a desired available function from being disabled when the battery remaining capacity becomes insufficient since the user overused other functions.

DESCRIPTION OF THE PREFERRED EMBODIMENT

An electronic device according to an embodiment of the present invention will be described below with reference to the drawings.

Figure 1:
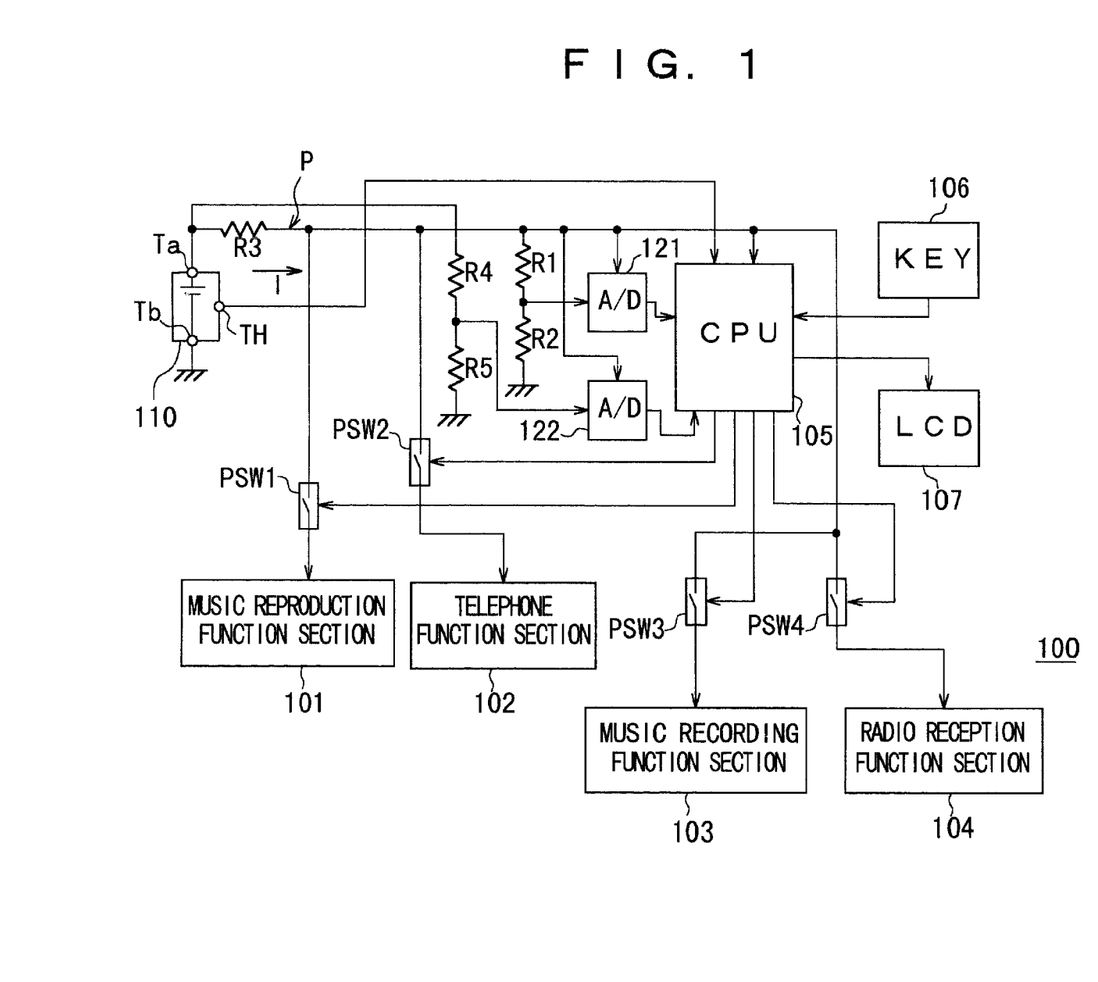
FIG. 1 is a block diagram showing an arrangement of an electronic device according to an embodiment of the present invention.

FIG. 1 of the accompanying drawings is a block diagram showing an arrangement of an electronic device according to an embodiment of the present invention.

An electronic device, generally depicted by reference numeral 100 in FIG. 1, may include a music reproduction function section 101, a telephone function section 102, a music recording function section 103 and a radio reception function section 104. The respective functions sections 101 to 104 can function independently.

The electronic device 100 may include a central processing unit (CPU) 105 for controlling a power supply, or the like. Although not shown, this CPU 105 may incorporate therein a memory for driving programs. This CPU 105 may include a key matrix 106 serving as an input device for enabling a user to operate the electronic device and a liquid-crystal display (LCD) 107 serving as a display device capable of displaying a user operation progress situation, a user operation result, or the like. The key matrix 106 may be replaced with a jog dial or a device effectively utilizing a speech recognition technique. Similarly, instead of the LCD 107, the user operation progress situation, the user operation result, or the like may be reported to a user by means of a speech synthesis output.

Figure 2:
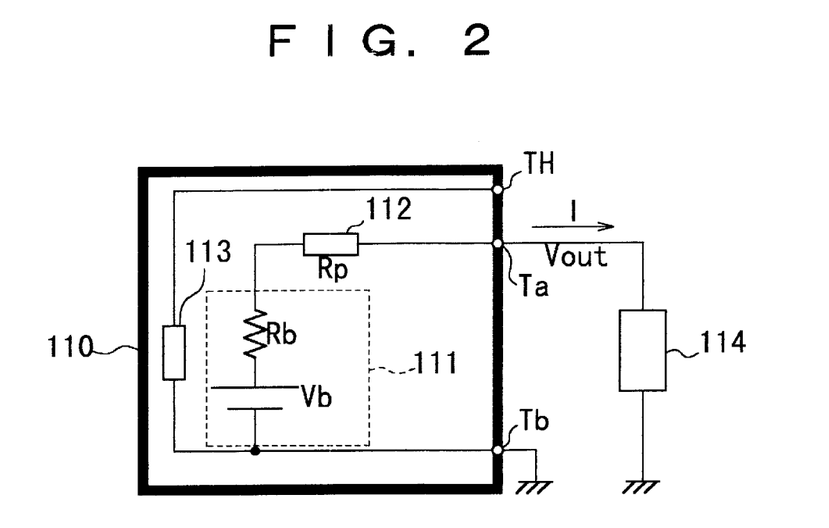
FIG. 2 is a circuit diagram showing an arrangement of a battery pack for use with an electronic device according to the embodiment of the present invention.

The electronic device 100 may include a battery pack 110. FIG. 2 shows an arrangement of the inside of the battery pack 110. As shown in FIG. 2, this battery pack may accommodate therein a rechargeable battery cell 111, a protection circuit 112 for protecting this battery cell 111 and a temperature sensor 113 for detecting an ambient temperature of this battery cell 111. The temperature sensor 113 may be comprised of a suitable temperature detection means such as a temperature detection thermistor, and may be disposed near or in contact with the battery cell 111. In this case, the negative electrode side of the battery cell 111 may be connected to a negative terminal Tb of the battery pack 110, while the positive electrode side of the battery cell 111 may be connected to a positive terminal Ta of the battery pack 110. Also, the output side of the temperature sensor 113 may be connected to a temperature sensor terminal TH of the battery pack 110.

The negative terminal Tb of this battery pack 110 may be connected to the ground, and the positive terminal Ta thereof may be connected to a load circuit 114 such as the above-mentioned respective function sections 101 to 104. Let us assume that I may represent the consumption current of the load circuit 114, Rp may represent the impedance of the protection circuit 112, Rb may represent the internal resistance of the battery cell 111 and Vb may represent the voltage of the battery cell 111 upon no-load. Then, the battery pack 110 may output an output voltage Vout expressed by the following equation (1):

$$Vout = Vb - I \times (Rp + Rb) \qquad (1)$$

Referring back to FIG. 1, the positive terminal Ta of the battery pack 110 may be connected to one end side of a-resistor R3 which may be used to detect the consumption current. The other end side P of this resistor R3 may be connected to the CPU 105 and analog-to-digital (A/D) converters 121, 122, and may be further connected through connection switches PSW1 to PSW4 to the function sections 101 to 104. These connection switches PSW1 to PSW4 may be turned on and off under control of the CPU 105.

The other end side P of the resistor R3 may be connected to the ground through a series circuit of resistors R1, R2 A voltage obtained at a junction between the resistors R1 and R2 may be converted into a digital value by the A/D converter 121 and supplied to the CPU 105. This digital value may be used by the CPU 105 to recognize the voltage Vp developed at the other end side P of the resistor R3.

Since the power source voltage of the A/D converter 121 is the voltage Vp, even when the voltage Vp is inputted to the A/D converter 121, the A/D converter 121 may be unable to convert such inputted voltage into a digital value because such voltage might be over the dynamic range. Accordingly, the resistors R1, R2 may be provided in order to shift the voltage Vp in such a manner that the voltage Vp may fall within the dynamic range of the A/D converter 121.

One end side of the resistor R3 may be connected to the ground through a series circuit of resistors R4, R5. A voltage obtained at the junction between the resistors R4 and R5 may be converted into a digital value and supplied to the CPU 105. This digital value may be used by the CPU 105 to recognize the voltage developed at one end side of the resistor R3, i.e. an output voltage Vout of the battery pack 110. The resistors R4, R5 may be provided for the same purpose as that of the above-mentioned resistors R1, R2.

As described above, the CPU 105 can recognize the voltage Vout developed at one end side of the consumption current detection resistor R3 and the voltage Vp developed at the other end side P on the basis of the digital values supplied from the A/D converters 121, 122. Thus, the CPU 105 can calculate the consumption current I based on the following equation (2). In consequence, the CPU 105 can constantly recognize a discharge current accumulated remaining quantity Q, which will be described later on, and can calculate a battery remaining capacity Qc as will be described later on.

$$I = (Vout - Vp)/R3 \qquad (2)$$

Figure 3:
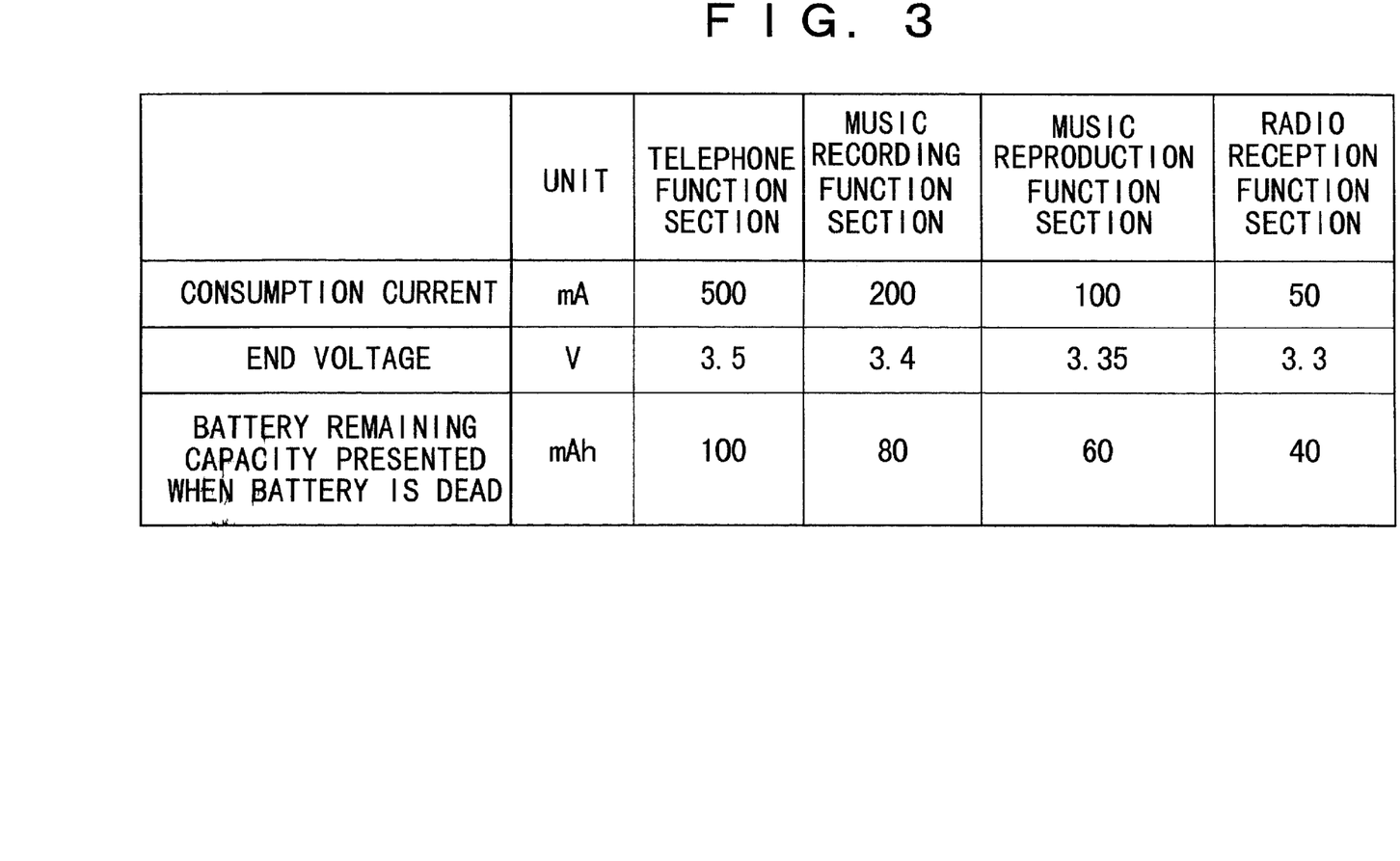
FIG. 3 is a table showing examples of consumption currents, end voltages, and battery remaining capacities presented when the battery is dead, of the respective function sections.

FIG. 3 is a table showing examples of consumption currents, end voltages, and capacities remaining when the battery is dead, of the music reproduction function section 101, the telephone function section 102, the music recording function section 103 and the radio reception function section 104. The consumption current might be an average current consumed by the corresponding function section when it is being operated (consumption current is measured in the factory when products are manufactured, and memorized in a memory within the CPU 105).

The end voltage may be a minimum battery voltage required by the corresponding function section to operate upon no-load (end voltage is set when products are designed, and memorized in the memory within the CPU 105). The no-load may be the state obtained when the function is not operated. In FIG. 2, the voltage Vb of the battery cell 111 may become equal to the output voltage Vout of the battery pack 110. The end voltage may be determined with reference to the internal resistance Rb of the battery cell 111 and the impedance Rp of the protection circuit 112 shown in FIG. 2.

Since the battery cell 11 may have the following factors ①②, the end voltage may not be obtained by calculation but may be determined in consideration of measured data in the past and empirical values. ①The internal resistance Rb has a temperature characteristic in which it may increase at a low temperature. ②The battery cell 111 may effectively utilize a chemical reaction and therefore may not be reversible (characteristic may be changed each time the battery may be charged and discharged, and also the characteristic may be deteriorated as the number of charging and discharging may increase).

The battery capacity remaining when the battery is dead may be an example of a result obtained when $g(w) \times h(T)$ expressed by an equation (3), which will be described later on, is calculated, and may be a capacity of a battery remaining when the battery reaches the end voltage. The higher the end voltage becomes the much more capacity remains in the battery. There can be used such a function whose end voltage is lower than the above-mentioned remaining capacity.

Figure 4:
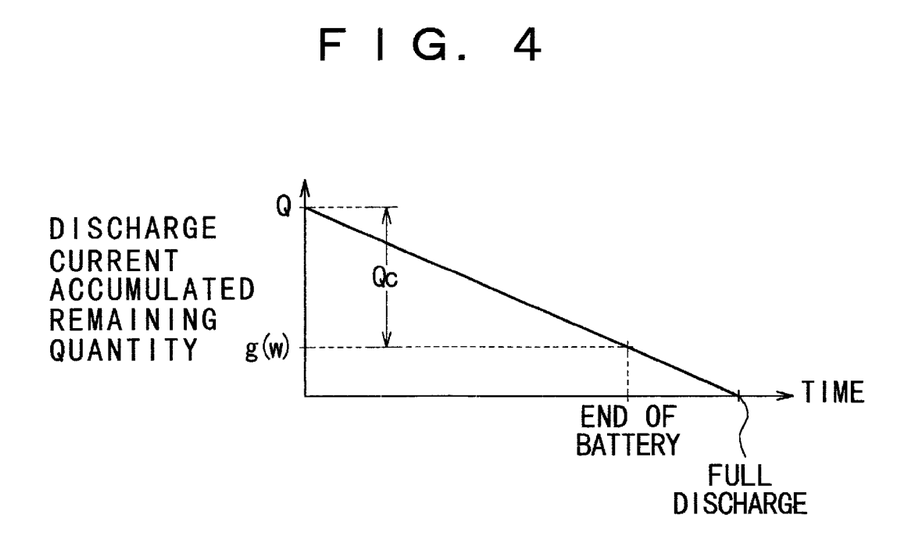
FIG. 4 is a graph showing a relationship between a discharge current accumulated remaining quantity and a time.

In the electronic device 100 shown in FIG. 1, the CPU 105 may successively calculate the battery remaining capacity Qc and may store calculated battery remaining capacities in the memory incorporated therein. The CPU 105 may calculate the battery remaining capacity Qc on the basis of the equation (3). Here, Q may represent a discharge current accumulated remaining quantity, and g(w) may represent a discharge current accumulated remaining quantity calculated from the end of the battery to the full discharge (see FIG. 4). Also, T may represent a temperature of the battery cell 111, and h(T) may represent a temperature dependence coefficient. The CPU 105 can calculate the current I flowing from the battery cell 111 on the basis of the aforementioned equation (2), and can also calculate g(w) from the flowing current I and the output voltage Vout as described above. Also, the CPU 105 can learn the temperature T on the basis of the detected output of the temperature sensor 113 from the temperature sensor terminal TH of the battery pack 110, and can calculate the temperature dependence coefficient h(T) as follows.

$$Qc=Q-g(w)\times h(T) \tag{3}$$

In the electronic device 100 shown in FIG. 1, when a user selects a desired function section by the key matrix 106, on the assumption that the battery voltage Vout obtained upon no-load is higher than the end voltage of such desired function section, the CPU 105 may control the connection switches PSW1 to PSW4 such that a power may be supplied from the battery pack 110 to the function section thus selected. For example, when the telephone function section 102 is selected, under control of the CPU 105, the connection switch PSW2 may be turned on so that a power may be supplied from the battery pack 110 to the telephone function section 102, thereby enabling the telephone function section 102 to function.

Also, in the electronic device 100 shown in FIG. 1, the user may select a reserved function section by the key matrix 106 and input information such as an available time, thereby resulting in the setting being made in order to reserve the selected function section so that the reserved function section can be used during a predetermined time period. In this setting, it become necessary to calculate a necessary current accumulated remaining quantity Qr of such function section. The CPU 105 may calculate the necessary current accumulated remaining quantity Qr on the basis of the following equation (4). In this equation (4), t may represent an available time, and j(w) may represent a coefficient which is used to convert the available time into the necessary current accumulated remaining quantity and which may depend on the consumption current. Also, k(T) may represent a temperature dependence coefficient of the battery cell 111.

$$Qr=t\times j(w)\times k(T) \tag{4}$$

In actual practice, since the consumption currents of the music reproduction function section 101, the telephone function section 102, the music recording function section 103 and the radio reception function section 104 may be different from each other, necessary current accumulated remaining quantities Qr1 to Qr4 in the respective function sections 101 to 104 may be calculated by the following equations (5) to (8):

$$Qr1=t1\times j(w1)\times k(T1) \tag{5}$$

$$Qr2=t2\times j(w2)\times k(T2) \tag{6}$$

$$Qr3=t3\times j(w3)\times k(T3) \tag{7}$$

$$Qr4=t4\times j(w4)\times k(T4) \tag{8}$$

Throughout the aforementioned equations (5) to (8), t1 to t4 may represent the available times of the respective function sections 101 to 104, j(w1) to j(w4) may represent the coefficients used to convert the available times of the respective function sections 101 to 104 into the necessary current accumulated remaining quantities, and k(T1) to k(T4) may represent the temperature dependence coefficients of the battery cell 111 obtained when the respective function sections 101 to 104 are in use. The user may input the available times t1 to t4 by the key matrix 106. The coefficients j(w1) to j(w4) may be set upon designing and may be memorized in the memory within the CPU 105. The user may input the available environment temperatures T1 to T4 by the key matrix, whereupon the CPU 105 may calculate the temperature dependence coefficients k(T1) to k(T4).

A total necessary current accumulated remaining quantity Qrt of the reserved function section which may be selected by the user so that the reserved function section can be used during a predetermined time period may be expressed by the following equation (9). In this case, in the function section which is not selected, the available time t is zero, and hence the necessary current accumulated remaining quantity Qr is zero. Therefore, the above-mentioned total necessary current accumulated remaining quantity Qrt can be constantly calculated by the following equation (9):

$$Qrt=Qr1+Qr2+Qr3+Qr4 \tag{9}$$

Figure 5A:
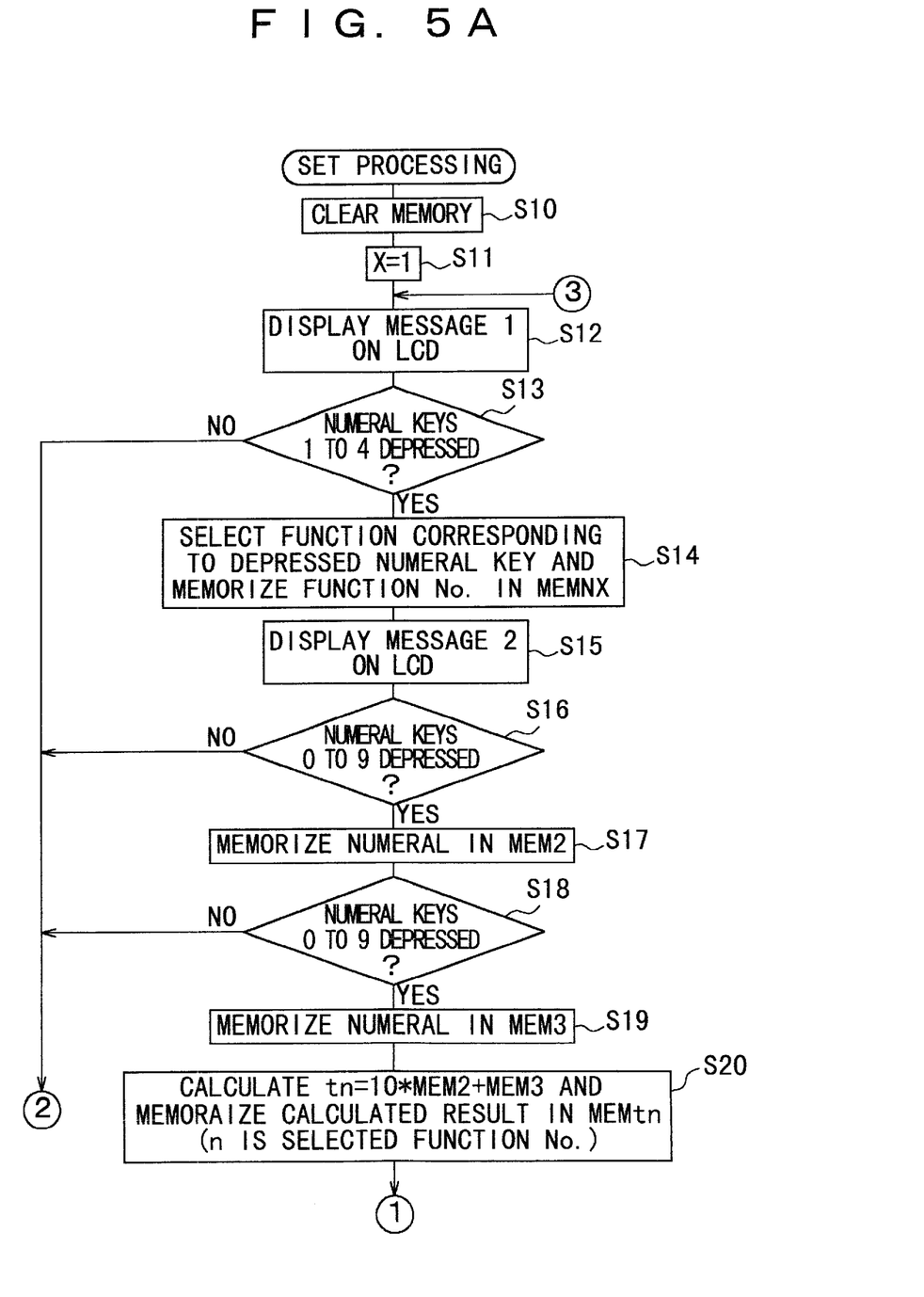
FIG. 5 (formed of FIGS. 5A and 5B drawn on two sheets of drawings so as to permit the use of a suitably large scale) is a flowchart to which reference will be made in explaining a control operation executed when the set processing is effected on a desired reserved function section.
Figure 5B:
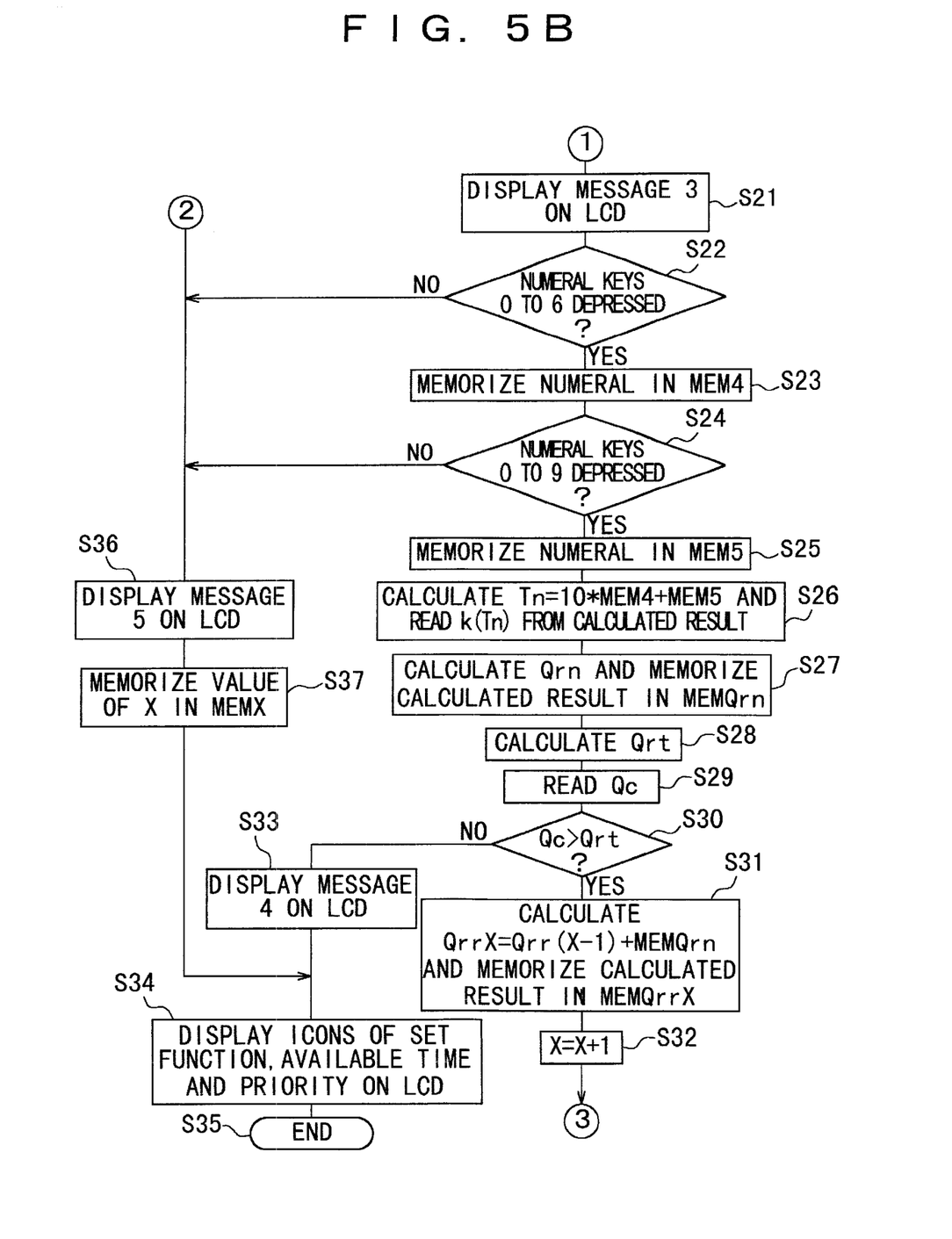

The manner in which the CPU 105 controls the power supply upon setting will be described next with reference to a flowchart of FIG. 5. FIG. 5 is formed of FIGS. 5A and 5B drawn on two sheets of drawings so as to permit the use of a suitably large scale.

Initially, referring to FIG. 5A, when a user starts the set processing based on the manipulation of the key matrix 106, control goes to a step S10, whereat values stored in a variety of memories incorporated within the CPU 105 and which might be used in this set processing are cleared to zeroes. Then, control goes to a step S11, whereat X is set to 1 (X=1). Control goes to a step S12, whereat the LCD 107 may display a message 1 for urging the user to select the reserved function section, such as "SELECT XTH FUNCTION YOU WANT TO USE WHEN BATTERY REMAINING CAPACITY IS INSUFFICIENT 1: RECORDING, 2: REPRODUCTION, 3: RADIO RECEPTION, 4: TELEPHONE, OTHER NUMERALS: END". In actual practice, the X portion may be displayed by Arabic numerals. An X–1th portion of a message 4, which will be described later on, may be displayed by Arabic numerals in actual practice.

On the basis of such display of message, the user may select the function section by operating the key matrix 106. To this end, control goes to the next decision step S13, whereat it is determined whether or not any one of numeral keys 1 to 4 is depressed. If any one of the numeral keys 1 to 4 is depressed as represented by a YES at the decision step S13, then control goes to a step S14. In the step S14, the function section corresponding to the depressed numeral key is selected, and the function No. is memorized in the memory [MEMNX].

Control goes to a step S15, whereat the LCD 107 may display a message 2 for urging the user to input an available time, such as "ENTER AVAILABLE TIME (UP TO 99 MINUTES AT MAXIMUM)". On the basis of such display of message, the user may input the available time by operating the key matrix 106. To this end, control goes to the next decision step S16, whereat it is determined whether or not any one of the numeral keys 0 to 9 is depressed. If any one of the numeral keys 0 to 9 is depressed as represented by a YES at the decision step S16, then control goes to a step S17, whereat a numeral of a second digit is memorized in a memory [MEM2]. Further, it is determined at the next decision step S18 whether or not any one of the numeral keys 0 to 9 is depressed. If any one of the numeral keys 0 to 9 is depressed as represented by a YES at the decision step S18, then control goes to a step S19, whereat a numeral of a first digit is memorized in a memory [MEM3]. Then, control goes to a step S20, whereat the user may calculate an available time tn=(=10*MEM2+MEM3) of the selected function section (n assumes a function NO.) by the numerals MEM2, MEM3 stored in the memory [MEM2] and the memory [MEM3], and this available time tn may be stored in a memory [MEMtn].

Referring to FIG. 5B, control goes to a step S21, whereat the LCD 107 may display a message 3 urging the user to input an available environment temperature, such as "ENTER AVAILABLE ENVIRONMENT TEMPERATURE (UP TO 69 DEGREES AT MAXIMUM)". On the basis of this display of such message, the user may input the available time by operating the key matrix 106. To this end, control goes to the next decision step S22, whereat it is determined whether or not any one of the numeral keys 0 to 6 is depressed. If any one of the numeral keys 0 to 6 is depressed as represented by a YES at the decision step S22, then control goes to a step S23, wherein a numeral at the second digit may be memorized in the memory [MEM4]. Further, control goes to the next decision step S24, whereat it is determined whether or not any one of the numeral keys 0 to 9 is depressed. If any one of the numeral keys 0 to 9 is depressed as represented by a YES at the decision step S24, then control goes to a step S15, whereat a numeral at the first digit may be memorized in the memory [MEM5].

Then, control goes to a step S26, whereat the user may calculate the available environment temperature Tn (=10*MEM4+MEM5) of the selected function section (n assumes the function NO.) by using the numerals MEM4, MEM5 memorized in the memory [MEM4] and the memory [MEM5], and may calculate the temperature dependence coefficient k(Tn) by using this available environment temperature Tn. Thereafter, control goes to a step S27, whereat the user may calculate a necessary current accumulated remaining quantity Qrn by using the available time tn, the temperature dependence coefficient k(Tn) and the coefficient j(wn) memorized in the above-mentioned memory [MEMtn], and may memorize the necessary current accumulated remaining quantity thus calculated in a memory [MEMQrn]. Then, control goes to a step S28, whereat the user may calculate a total necessary current accumulated remaining quantity Qrt on the basis of the above-mentioned equation (9).

Next, control goes to a step S29, whereat the battery remaining capacity Qc calculated by the above-mentioned equation (3) may be read out from the incorporated memory. Then, it is determined at the next decision step S30 whether or not the battery remaining capacity Qc is greater than the total necessary current accumulated remaining quantity Qrt. If an inequality Qc>Qrt is satisfied as represented by a YES at the decision step S30, then control goes to a step S31, whereat the user may calculate a total necessary current accumulated remaining quantity QrrX=Qrr(x−1)+MEMQrn (MEMQrn may be Qrn memorized in the memory [MEMQrn]) of the function sections up to the X-th function section sequentially selected by the user and may memorize the value thus calculated in the memory [MEMQrrX]. Then, control goes to a step S32, whereat X is incremented by 1 (X=X+1), and control goes back to the step S12, whereat control goes to the set processing to set the next (X+1)th reserved function section, thereby resulting in similar control operations as described above being executed.

If on the other hand the inequality Qc>Qrt is not satisfied as represented by a NO at the step S30, then control goes to a step S33, whereat the LCD 107 may display a message 4 indicating that the setting of the Xth selected function section cannot be saved because the battery remaining capacity Qc is insufficient, such as "CAPACITY INSUFFICIENT. SAVE SETTING UNTIL DESIRED X−1TH RESERVED FUNCTION". Then, control goes to a step S34, whereat the LCD 107 may display the setting contents of the function sections up to the X−1th function section. Then, control goes to a step S35, whereat the processing is ended. When the setting contents are displayed at the step S34, there may be displayed icons indicating the selected function sections up to the X−1th function section, their available times and their priorities. In this case, the priority might be the order in which the function sections are selected by the user. The user may input the priority in the same way as the user may input the above-mentioned available time and available environment temperature.

If any one of the numeral keys 1 to 4 is not depressed as represented by a No at the decision step S13, if any one of the numeral keys 0 to 9 is not depressed as represented by a NO at the decision step S16, if any one of the numeral keys 0 to 9 is not depressed as represented by a NO at the decision step S18, if any one of the numeral keys 0 to 6 is not depressed as represented by a NO at the decision step S22 and further if any one of the numeral keys 0 to 9 is not depressed as represented by a NO at the decision step S24, then control goes to a step S36. At the step S36, the LCD 107 may display a message 5 indicating that the setting contents of the function sections up to the X−1th function section may be saved and the Xth setting contents may not be saved because they are imperfect, such as "SAVE COMPLETED SETTING CONTENTS AND DO NOT SAVE INCOMPLETE SETTING CONTENTS". Thereafter, at a step S37, the value of X may be memorized in the memory [MEMX], and control goes to the step S34, whereat the setting contents may be displayed on the LCD 107. Then, control goes to the step S35, whereat the processing is ended.

According to the above-mentioned set processing, there may be executed the set processing to reserve one or a plurality of function sections which can be used during a predetermined time period. Then, the manner in which the CPU 105 may control the power supply after the above-mentioned set processing was ended will be described with reference to a flowchart of FIG. 6.

Figure 6:
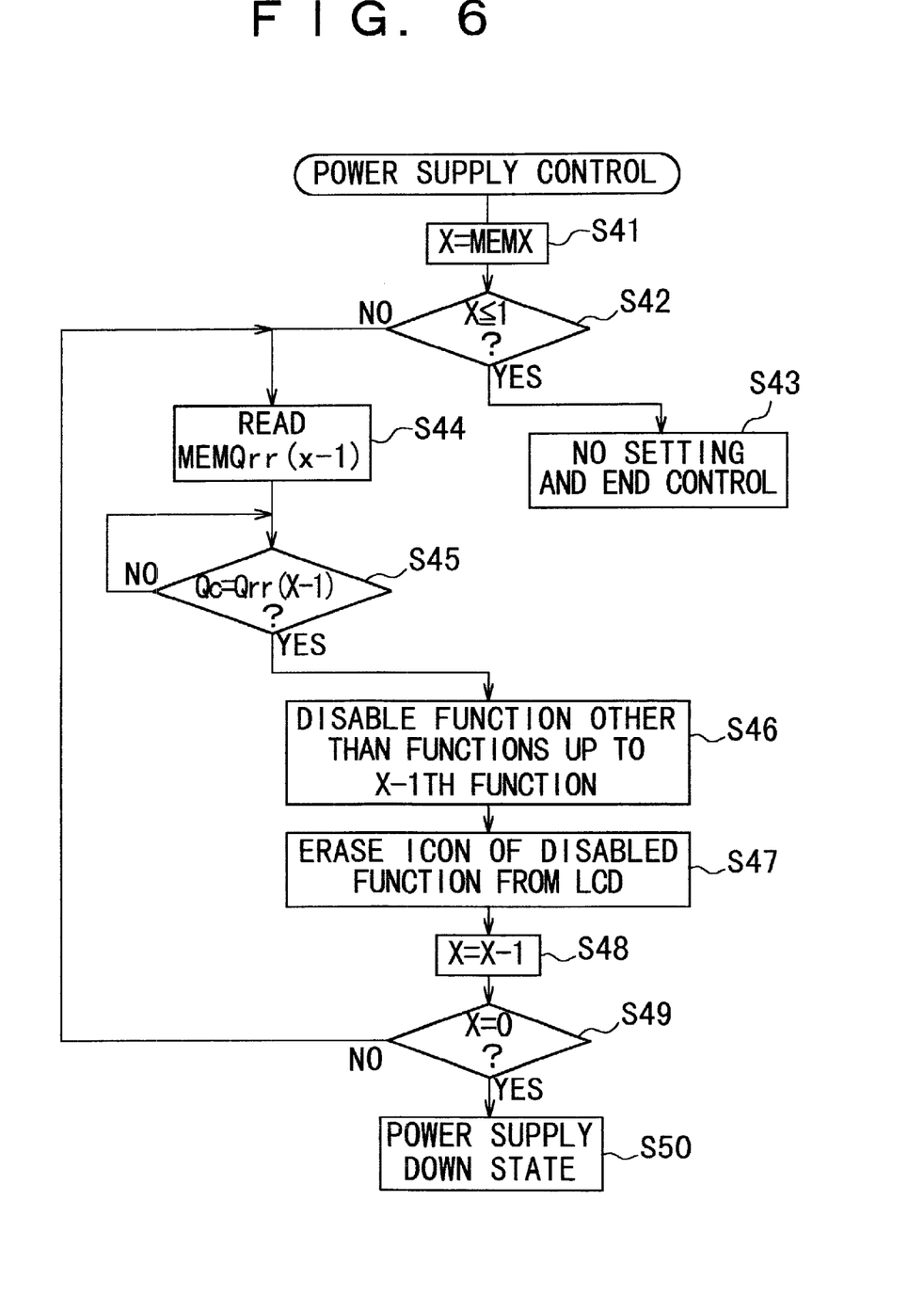
FIG. 6 is a flowchart to which reference will be made in explaining a power supply control operation executed after the setting was ended.

Initially, referring to FIG. 6, and following the power supply control operation, control goes to a step S41, whereat X assumes a value memorized in the memory [MEMX]. Then, control goes to the next decision step S42. It is determined at the decision step S42 whether or not the value X is equal to or smaller than 1. If the value X is equal to or smaller than 1 as represented by a YES at the decision step S42, then this, as a result, means that the reserved function section is not set by the above-mentioned set processing. Therefore, control goes to a step S43, whereat the control operation is ended.

If on the other hand the value X is greater than 2 as represented by a NO at the decision step S42, then this means that one or a plurality of reserved function sections were set. Then, control goes to a step S44. In the step S44, Qrr(X−1) (total necessary current accumulated remaining quantity of the function sections up to the X−1th reserved function section) may be read out from the memory [MEMQrr(X−1)]. Then, control goes to the next decision step S45. It is determined at the decision step S45 whether or not the battery remaining capacity Qc is equal to the total necessary current accumulated remaining quantity Qrr(X−1). A study of the flowcharts shown in FIGS. 5A and 5B reveals that, since there are reserved function sections up to the X−1th function sections, Qrr(X−1) obtained when control goes from the step S42 to the step S44 may become equal to all of total necessary current accumulated remaining quantities of the function sections which may be set so as to be reserved. Qrr0 that is memorized in the memory [MEMQrr0] may be zero.

If the equality Qc=Qrr(X−1) is satisfied as represented by a YES at the step S45, then control goes to a step S46, whereat the functions of all function sections other than the function sections up to the X−1th function section may be disabled. That is, under control of the CPU 105, of the connection switches PSW1 to PSW4, the connection switches corresponding to all function sections other than the function sections up to the X−1th function sections may be turned off to stop the supply of power from the battery pack 110. The user can learn the function sections up to the X−1th function section from the function Nos. memorized in the memory [MEM1] to the memory [MEMN(X−1)].

Then, control goes to a step S47, whereat icons of the disabled function sections may be erased from the LCD 107. Thus, the user can learn the available function sections. The manner in which the CPU 105 controls the functions of the respective function sections may not always be displayed on the LCD 107 but may be reported to the user by means of sounds, or the like based on a speech synthesis, for example. Following the step S47, control goes to a step S48, whereat X is decremented by 1 (X=X−1). Then, control goes to the next decision step S49, whereat it is determined whether or not an equality X=0 is satisfied.

If the equality X=0 is not satisfied as represented by a NO at the decision step S49, then control goes back to the step S44, and the following steps will be repeated. Thus, when the battery remaining capacity Qc becomes equal to the total necessary current accumulated remaining quantity of one or a plurality of function sections which might be set so as to be reserved, the functions of the function sections other than the one or the plurality of function sections may be disabled, whereafter the function of the function section with the priority N+1 may be disabled each time the battery remaining capacity Qc may become equal to the total necessary current accumulated remaining quantity of the function sections up to the function section with the priority N (N is an integer greater than 1).

If on the other hand the equality X=0 is satisfied as represented by a YES at the decision step S49, then control goes to a step S50. If X=0 is satisfied, then the battery remaining capacity Qc becomes equal to Qrr0=0 at the step S45. Then, at the step S46, the function of the function section with the priority 1 also may be disabled. As a result, at the step S50, the power supply goes down so that user cannot operate the keys in the key matrix 106.

As described above, according to this embodiment, the user may place the electronic device in the setting state by operating the key matrix 106 and may select the reserved function section and input the available time of the reserved function section or the like, whereby the user can execute the setting such that one or a plurality of reserved function sections can be used during a predetermined time period. On the basis of such setting, the power supply control operation may be executed so that the one or the plurality of reserved function sections can be used during the predetermined time period. Therefore, according to the above-mentioned setting, it is possible to prevent the desired function from being disabled by the insufficient battery remaining capacity Qc obtained after other functions were overused. That is, the functions of the respective function sections can be controlled with the user's intention reflected thereon.

For example, let us assume that the user may make the setting such that the telephone function section 102 may be reserved and the reserved telephone function 102 can be used for 10 minutes. When the music reproduction function section 101 is used continuously and the battery remaining capacity Qc becomes insufficient so that the battery remaining capacity becomes equal to the necessary current accumulated remaining quantity for operating the above-mentioned reserved telephone function section 102 for 10 minutes, including the music reproduction function section 101, the functions of the function sections other than the telephone function section 102 may be disabled. Therefore, it may be reserved that the telephone function section 102 can be used for 10 minutes.

Also, a plurality of reserved function sections are set, initially, a plurality of function sections may be reserved, whereafter functions of function sections may be sequentially disabled in the order of a lower priority. Thus, the higher priority the function section may have the longer the time period in which the function section can be used becomes in excess of the set available time.

For example, let us assume that the telephone function section 102 may be set as the first reserved function section with the available time of 10 minutes and the music reproduction function 101 may be set as the second reserved function with an available time of 5 minutes. In this case, if the consumption currents and the available environment temperatures of the telephone function section 102 and the music reproduction function section 101 are identical to each other, after the function sections other than the telephone function section 102 and the music reproduction function section 101 are disabled, although the music reproduction function section 101 can be used for 5 minutes at maximum, the telephone function section 102 can be used during a time period of (10+5) minutes at maximum.

While the CPU 105 may control the functions of the respective function sections 101 to 104 by controlling the supply of power to these respective function sections in the above-mentioned embodiment, the central processing unit may control these function sections by controlling power supply control lines, i.e. chip-enable.

Also, in the above-mentioned embodiment, the battery pack 110 may not include a CPU and the battery pack 110 cannot be attached to and detached from the electronic device by the user. In this case, if the battery pack is made detachable, when the user attaches the battery pack 110 to other device and charges or discharges the battery pack, such information may not be stored in the battery pack 110 and the discharge current accumulated remaining quantity Q of the aforementioned equation (3) cannot be known with the result that it become impossible to calculate the battery remaining capacity Qc. However, as shown in FIG. 1 of Japanese laid-open patent application No. 9-297166, the battery pack 110 also may include a CPU and therefore the battery pack 110 may be made detachable.

Also, while there are illustrated four function sections which can function independently by way of example in the above-mentioned embodiment, the number of the function sections is not limited thereto. Also, the function sections which can function independently are not limited to the scale in the above-mentioned embodiment and may be a smaller scale, for example. By way of example, a ringer section and a vibrator disposed within the telephone function section 102 for reporting an incoming call and a light-emitting diode (LED) for displaying an incoming call also can be integrated into function sections which can function independently. In this case, for example, when the battery remaining capacity Qc is sufficient, all function sections can function. When the battery remaining capacity Qc is decreased, function sections other than one kind of the function section that was set by the user in advance are disabled.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic device for use with a portable telephone powered by a battery and having a plurality of function sections which function independently, said electronic device comprising:

detection means for detecting a remaining capacity of said battery;

user operation means for selecting one or a plurality of function sections which a user wants to reserve from said plurality of function sections and inputting an available time of said one or said plurality of function sections;

setting means for setting a relationship between said battery remaining capacity and an available function section based on operation information from said user operation means; and function control means for individually controlling functions of said plurality of function sections based on said battery remaining capacity detected by said detection means and said relationship set by said setting means.

2. The electronic device as claimed in claim 1, wherein said function control means individually controls functions of said plurality of function sections by controlling one of a power supply and a power supply control line relative to said plurality of function sections.

3. The electronic device according to claim 1, further comprising reporting means for reporting a control state made by said function control means.

4. The electronic device as claimed in claim 1, wherein said setting means calculates a necessary current accumulated quantity of said one or said plurality of function sections, and sets a relationship in which only said one or said plurality of function sections are available if said battery remaining capacity is below a total necessary current accumulated remaining quantity.

5. The electronic device as claimed in claim 4, wherein said setting means calculates a necessary current accumulated remaining quantity of one or a plurality of function sections whose predetermined available time is reserved by using input information of an available time and an available environment temperature of said one or said plurality of function sections inputted by said user operation means.

6. The electronic device as claimed in claim 1, wherein said setting means calculates a necessary current accumulated remaining quantity of said one or said plurality of function sections and sets a relationship in which only a function section with a priority below a priority N (N is an integer greater than 1) is available if said battery remaining capacity is below a total quantity of necessary current accumulated remaining quantities of function sections up to a function section with said priority N.

7. The electronic device as claimed in claim 6, wherein said setting means calculates a necessary current accumulated remaining quantity of one or a plurality of function sections which reserve said predetermined available time by using input information of an available time and an available environment temperature of said one or said plurality of function sections.

8. The electronic device as claimed in claim 6, wherein said priority is a priority in which said one or said plurality of function sections are selected by said user operation means.

* * * * *